(12) United States Patent
Newman

(10) Patent No.: US 6,353,890 B1
(45) Date of Patent: *Mar. 5, 2002

(54) METHOD FOR COPY PROTECTING A RECORD CARRIER, COPY PROTECTED RECORD CARRIER AND MEANS FOR DETECTING ACCESS CONTROL INFORMATION

(75) Inventor: Peter A. Newman, Berkshire (GB)

(73) Assignee: C-Dilla Limited, Berkshire (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/086,694

(22) Filed: May 29, 1998

(30) Foreign Application Priority Data

May 30, 1997 (GB) ............................................. 97303706

(51) Int. Cl.$^7$ .............................. G06F 12/14; H04L 9/32
(52) U.S. Cl. ........................ 713/193; 713/187; 380/201; 705/57
(58) Field of Search ................................. 713/187, 193; 380/201; 714/48, 49, 57, 157

(56) References Cited

U.S. PATENT DOCUMENTS

| 4,417,338 A | * | 11/1983 | Davida | ........................ 371/37 |
| 5,400,319 A | | 3/1995 | Fite et al. | ................. 369/275.5 |
| 5,408,531 A | * | 4/1995 | Nakajima | ........................ 380/3 |
| 5,528,755 A | * | 6/1996 | Beardsley et al. | ...... 395/185.01 |
| 5,652,795 A | * | 7/1997 | Dillon et al. | .................. 380/25 |
| 5,703,858 A | | 12/1997 | Mitchell et al. | ............... 369/58 |
| 5,761,301 A | * | 6/1998 | Oshima et al. | ................. 380/4 |

FOREIGN PATENT DOCUMENTS

| EP | 0533204 A2 | 3/1993 | ........... G11B/20/00 |
| EP | 0545472 A1 | 6/1993 | |
| JP | 8-129828 | 5/1996 | ........... G11B/20/10 |
| JP | 9-044995 A | 2/1997 | ........... G11B/20/10 |

* cited by examiner

Primary Examiner—Gail Hayes
Assistant Examiner—Justin T. Darrow
(74) Attorney, Agent, or Firm—Michael E. Belk

(57) ABSTRACT

A method for copy protecting a record carrier using a pattern of logical errors which cannot be corrected by the error correcting rules predefined for the record carrier. The pattern of logical errors represents access control information. The logical errors are generated during decoding the bit sequence read from the record carrier. Bit errors may be positioned in the bit sequence so as to counteract de-interleaving which is part of an error decoding process in a reading device and accumulate in error words which are uncorrectable. Also a method for detecting access control information and a retrieval arrangement, which detects the access control information by selecting at least one error location, but not all error locations on the record carrier, and verifying the presence of an error by reading the selected error location via the reading means.

26 Claims, 4 Drawing Sheets

Figure 1:
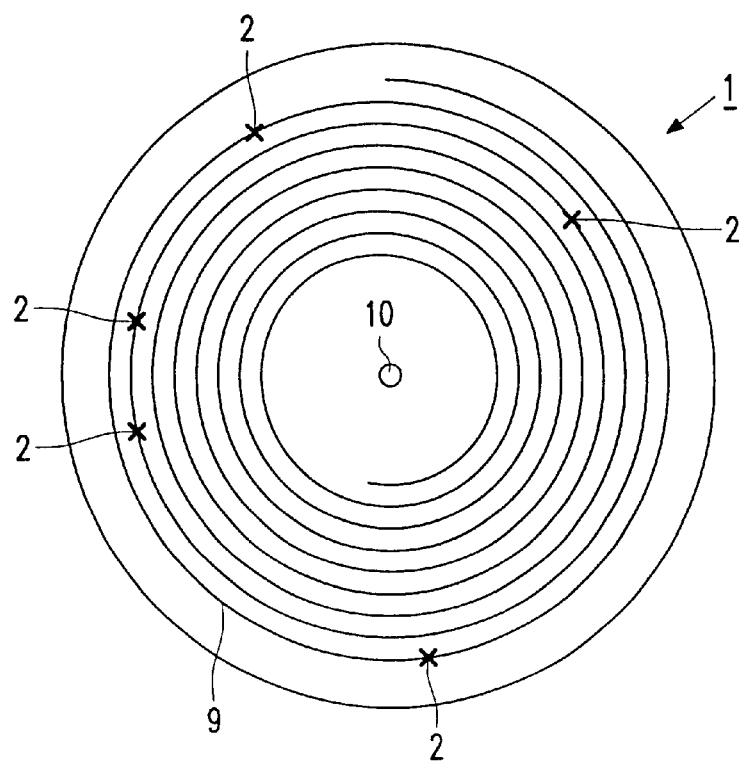

```
BYTE NR   FRAME NUMBERS
                              1                   2
              1 2 3 4 5 6 7 8 9 0 1 2 3 4 5 6 7 8 9 0 1

0         a a a a
    1         b b b b a a a a
    2           c c c c b b b b a a a a
    3             d d d d c c c c b b b b a a a a
    4               e e e e d d d d c c c c b b b b a a a a
    5                   e e e e d d d d c c c c b b b b
    6                       e e e e d d d d c c c c
    7                           e e e e d d d d
    8                               e e e e
    9
   ..
   31
```

METHOD FOR COPY PROTECTING A RECORD CARRIER, COPY PROTECTED RECORD CARRIER AND MEANS FOR DETECTING ACCESS CONTROL INFORMATION

The invention relates to a method for copy protecting a record carrier having information stored thereon according to predetermined formatting and error correcting rules, comprising the steps of creating an image file comprising main information, generating access control information for controlling the access to the main information, producing a master carrier in dependence on the image file and the access control information, which producing comprises the steps of creating a bit sequence by applying the formatting and error correcting rules to the image file and translating the bit sequence into a physical pattern of marks, and multiplicating the record carrier using the master carrier.

The invention further relates to a copy protected record carrier having a bit sequence stored thereon representing information according to predetermined formatting and error correcting rules, the information comprising main information and access control information for controlling the access to the main information.

The invention further relates to a method for detecting access control information on such a copy protected record carrier.

The invention further relates to a retrieval arrangement for retrieving information from such a copy protected record carrier, the arrangement comprising reading means for reading the record carrier, the reading means comprising a read unit for extracting a bit sequence stored on the record carrier and an error correcting unit for processing the bit sequence.

A system for copy protecting a record carrier, a copy protected record carrier and a reading arrangement are known from EP-0545472 (document D1 in the list of related documents). The known record carrier comprises a prearranged guiding track, a so-called pregroove. In the track determined by the pregroove, information which is written in a predefined manner is represented by optically readable patterns which are formed by variation of a first physical parameter, such as the height of the scanned surface. The pregroove has variations in a second physical parameter, such as an excursion in a transverse direction, also denoted as wobble. Pregroove wobble is FM-modulated and this modulation represents access control information which is related to information, such as a descramble code for recovering information stored as scrambled information. The known device comprises reading means for reading the patterns and recovering means for recovering the access control information. The known device and information carrier form a system for controlled information reproduction. For this purpose, the device comprises means for reproducing the information in dependence on the access control information. If the information is copied on a writable information carrier, the information of this copy will not be reproduced, because during the writing process only the patterns are written and the copy itself does not contain any access control information. A problem in the known system is that the reading means must be able to recover the access control information by detecting the variations of the second physical parameter.

It is an object of the invention to provide a system for copy protecting record carriers which does not rely on variations of physical parameters, while the making of usable copies on writable information carriers is counteracted.

For this purpose a method for copy protecting a record carrier as described in the opening paragraph, is characterized according to the invention in that in the producing step bits in the bit sequence are changed according to the access control information to constitute logical errors which cannot be corrected by said error correcting rules and which constitute an error pattern. A copy protected record carrier as described in the opening paragraph is characterized according to the invention in that the bit sequence comprises bit errors constituting logical errors which cannot be corrected by said error correcting rules and which constitute an error pattern representing at least part of the access control information. The measures are advantageous in that the error pattern can be easily detected, while errors cannot be included in information stored on a copy of the record carrier via a standard recording device, because such recording devices have built in error correcting rules, which cannot be manipulated.

According to a second aspect of the invention a method for detecting access control information on such a copy protected record carrier is characterized in that the method comprises the steps of selecting at least one error location, but not all error locations, which error location(s) should have a logical error according to the error pattern, and verifying the presence of an error by reading the selected error location(s). A retrieval arrangement for retrieving information from such a copy protected record carrier as described in the opening paragraph is characterized in that the arrangement comprises access control means for controlling the access to the information, which access control means are embodied so as to detect the access control information by selecting at least one error location, but not all error locations, which error location(s) should have a logical error according to the error pattern, and by verifying the presence of an error by reading the selected error location via the reading means. This is advantageous in that selecting a few error locations from an available larger number results in a fast response for the access control means. Reading a sector having errors might take up to 30 seconds on a standard reading device, such as a CD-ROM drive, due to automatic retries. Also selecting different locations for each access control session increases the difficulties for a malicious party in mimicking the access control process.

It is to be noted, that WO 95/03655 (document D3) describes a CD PROM encryption system, in which the information on a CD-ROM is encrypted by a key, which key is programmed into the CD-ROM after manufacture by damaging selected sectors to be unreadable by conventional read systems. The selected sectors are physically damaged by a high power laser. Record carriers are individually enabled by having a specific key for a certain user or group of users.

The invention is also based on the following recognition. Physically damaging selected parts of a record carrier leads to corrupted physical marks. When reading such damaged parts a read head may lose the track, or the translation from the read signal to a bit sequence may be disrupted or lose synchronisation, which all result in an uncontrollable number of errors. Moreover, physical damage may be easily detected from physical parameters and may be mimicked by a malicious party by physical means. Also, physically damaging sectors increases the production cost. The invention is based on a logical pattern of errors, which does not increase production cost and allows precise control of the resulting errors. In addition the inventors have had the insight, that physical errors cannot be used for generating errors in a limited part of the retrieved information, as they are similar to burst errors, which type of error is spread widely due to de-interleaving steps usually applied to the bit sequence in an error correcting and deformatting process for retrieving the information. Therefore, an embodiment of the copy protected record carrier is characterized in that, while the bit sequence comprises information bits and error correction bits, the information bits comprise the bit errors and/or in that the bit errors are located so as to accumulate in an error word uncorrectable by an error word correcting rule when reproducing. This is advantageous in that the bit errors are concentrated in error words resulting unambiguously in logical errors, while no error bits are spread to other parts of the retrieved information.

A further embodiment of the copy protected record carrier, which record carrier is subdivided into addressable sectors, is characterized in that the record carrier comprises a padding area, which padding area comprises error sectors and non-error sectors, which error sectors comprise the logical errors and constitute the error pattern. Using sectors as constituting elements for the error pattern has the advantage, that standard reading devices will read and process the read information sector by sector, while generating an error message if somewhere in a sector an uncorrectable error has been detected.

A further embodiment of the copy protected record carrier is characterized in that the part of the bit sequence corresponding to non-error sectors which adjoin error sectors comprises substantially no bit errors. In the case of some dirt or scratches the affected sectors will show random or small burst errors. If such errors had to be corrected in the presence of intentional bit errors, there would be an increased risk that a non-error sector would be classified as an error sector. Having substantially no intentional bit errors is advantageous in that there is a low probability of non-error sectors being wrongly classified.

A further embodiment of the copy protected record carrier is characterized in that, while the record carrier has a predetermined information storage capacity of which the main information covers a part, the padding area substantially covers the remaining part of the information storage capacity. This has the following advantage. All logical errors constituting the error pattern can only be detected by reading all of the padding area. On an average record carrier a relatively large percentage of the information storage capacity may be unused, which is available for the error pattern without the production cost increasing. At for example 20 seconds reading time for a sector having errors due to retries, it will take over 1000 hours to read the total padding area on a CD-ROM having 60% unused capacity.

An embodiment of the method for detecting access control information is characterized in that the method further comprises the steps of selecting at least one non-error location, but not all non-error locations, which non-error location(s) should not have a logical error according to the error pattern, and verifying the absence of an error by reading the selected non-error location(s). This is advantageous in that an illegal copy having also errors on non-error locations will be detected.

A further embodiment of the method for detecting access control information is characterized in that at least one non-error location is selected which adjoins an error location. This is advantageous in that an illegal copy having physical or burst type errors spreading over more locations due to de-interleaving rules will be detected.

Further advantageous, preferred embodiments of the copy protected record carrier, the retrieval arrangement and methods according to the invention are given in the further dependent claims.

Figure 2:
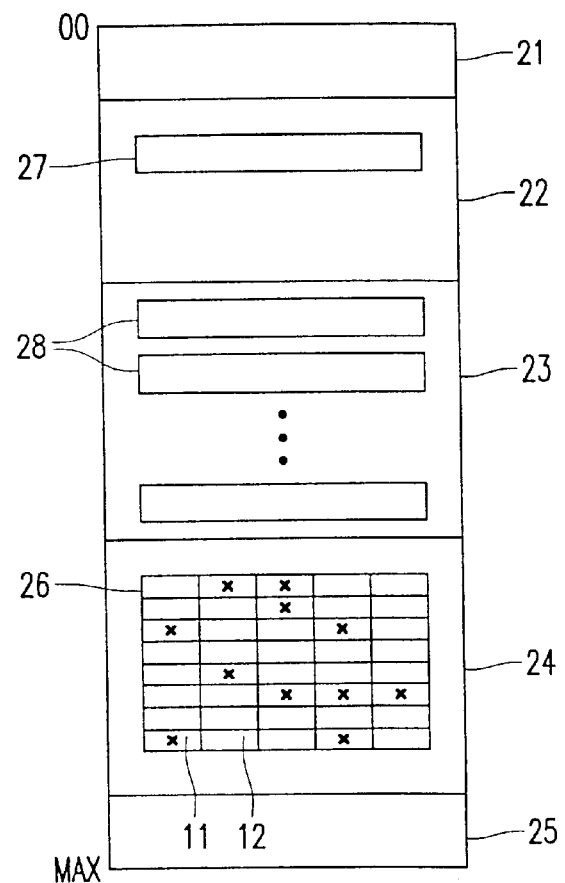
Figure 3:
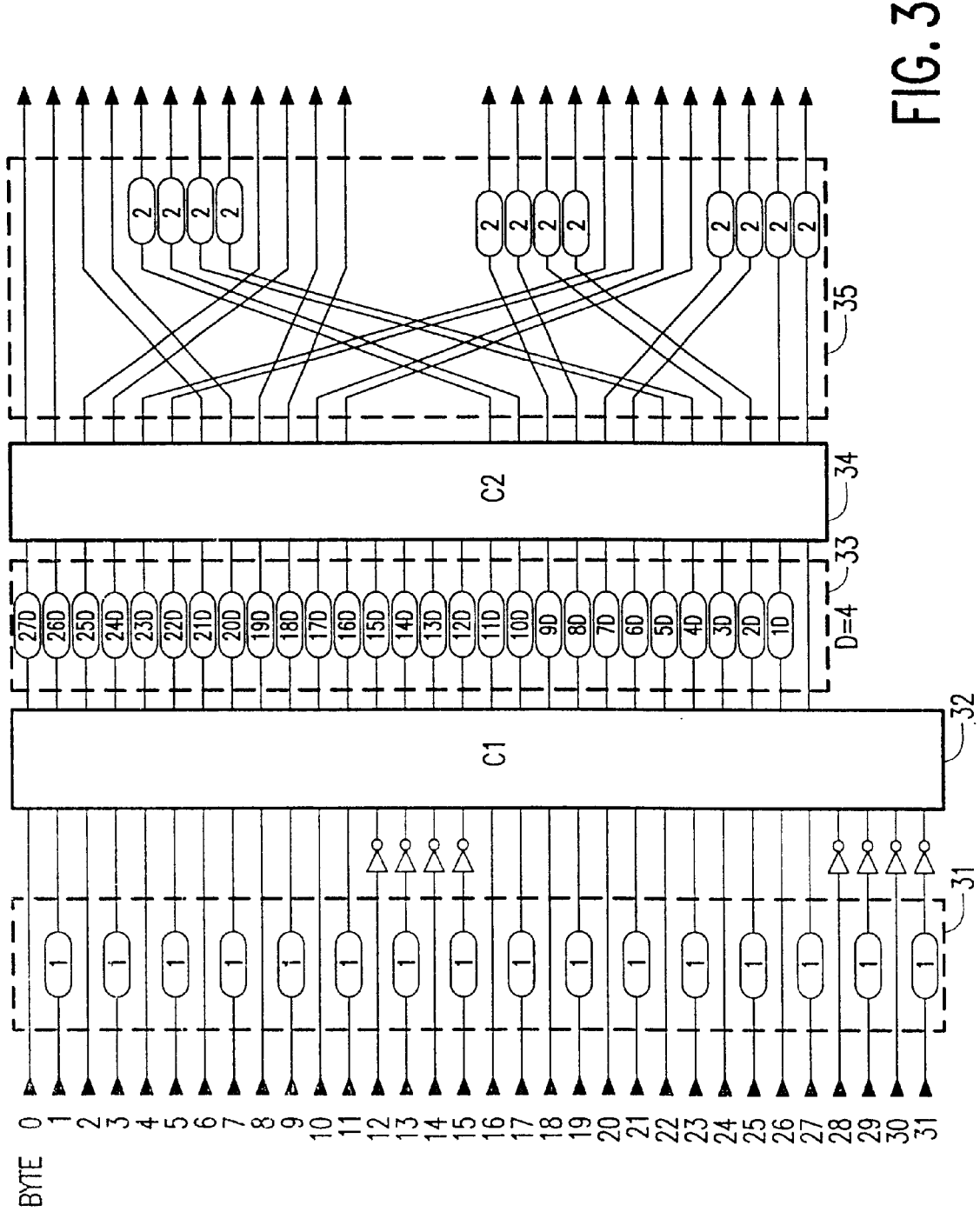
Figures 4, 5:
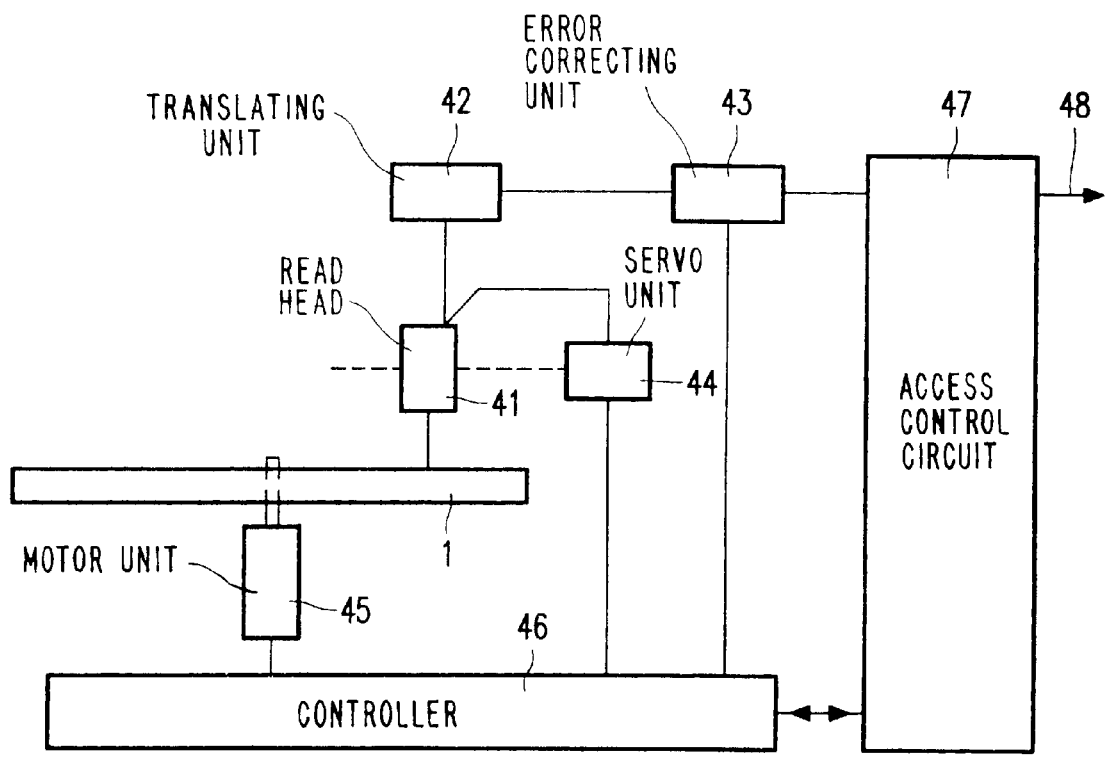
Figure 6:
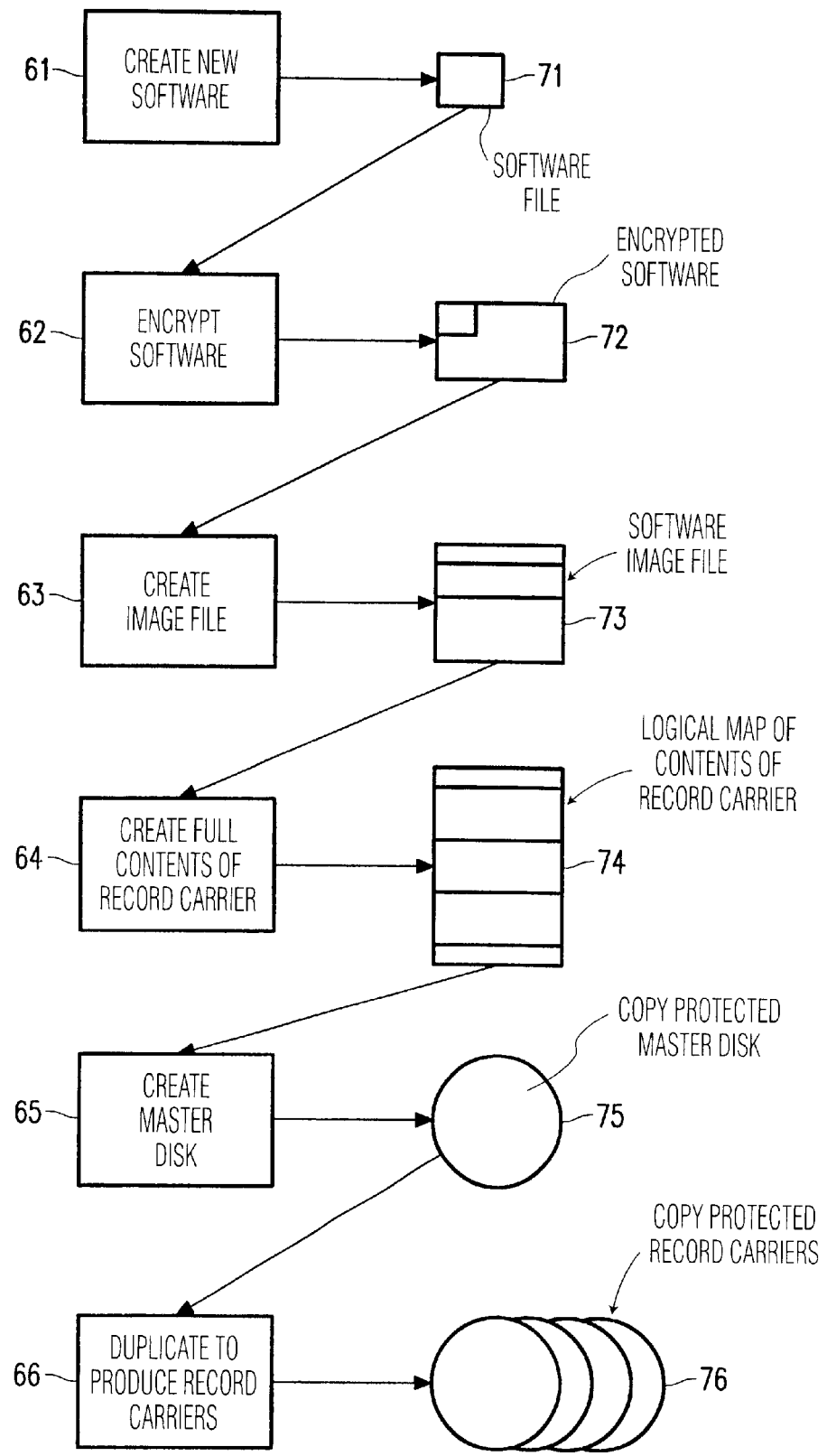

These and other aspects of the invention will be apparent from and elucidated further with reference to the embodiments described by way of example in the following description and with reference to the accompanying drawings, in which FIG. 1 shows a copy protected record carrier FIG. 2 shows a logical map of the recording area of a copy protected record carrier FIG. 3 shows an error correcting unit FIG. 4 shows a bit error pattern FIG. 5 shows an arrangement for retrieving information from a copy protected record carrier FIG. 6 shows a schematic diagram for copy protecting a record carrier FIG. 1 shows schematically a disc-shaped copy protected record carrier 1. The record carrier comprises a track 9 for storing information, which track is arranged in a helical pattern of windings around a central hole 10. The windings may also be arranged concentrically in lieu of helically. The record carrier 1 is of an optically readable type in which a transparent substrate is covered by a recording layer and a protective layer, such as the well-known Compact Disc (CD). Information on the information carrier is represented by patterns of optically readable marks. For example, the position and/or the length of the marks then represent a binary information signal. The marks may be made by presses, as is customary for read-only CD's, such as CD-ROM on which embossed pits and lands between the pits represent the information. The invention can be used for any type of record carrier, on which information is recorded according to predetermined error correcting rules, such as the high density optical disc DVD (Digital Versatile Disc), optical tape or magnetic tape for digital video. The track 9 comprises the marks and is scannable by a read head for reading the stored information. The marks represent a bit sequence according to a channel code, such as EFM for CD (Eight to Fourteen Modulation). The bit sequence represents information according to predetermined error correction and formatting rules, such as the CIRC (Cross Interleaved Reed-Solomon Code) for CD. According to the formatting rules the record carrier may be subdivided in addressable sectors, such as on the CD-ROM. The CD-ROM is described in standard ISO 10149, the CD-ROM specification.

The information on the copy protected record carrier 1 comprises main information and access control information for controlling the access to the main information, so as to prevent access to main information copied on an illegal copy, which copy does not comprise all necessary access control information. According to the invention the copy protected record carrier 1 is provided with logical errors 2, which logical errors constitute an error pattern representing at least some of the access control information. The error pattern has at least one logical error at a predetermined location, but preferably a pattern of logical errors at a relatively large number of predetermined locations. A different error pattern may be generated for each new title to be distributed on a copy protected record carrier. In an embodiment of the error pattern the error locations should be intermixed with non-error locations or with essential information. Further the error pattern may comprise a number of isolated error locations in between non-error locations, but also some consecutive error locations. Preferably the pattern of error locations is a pseudo random pattern comprising circa 50% error locations and 50% non-error locations, the pseudo random pattern being generated from a seed value by a predetermined algorithm. The error pattern is to be verified in an access control procedure, which procedure is indissolubly embedded in the procedure to use the main information. The verification should include at least one error location and preferably also at least one non-error location in the vicinity of an error location. This prevents a malicious party of easily mimicking the error pattern by physically damaging a few locations. A logical error is constituted by a number of bit errors in the bit sequence, which number of bit errors is uncorrectable by said error correcting rules. The bit errors cannot be copied using a standard recording device, as such a device will accept information to be recorded without error correction bits. The recorder will process this information according to the build in, predetermined error correcting and formatting rules for generating a new bit sequence, including newly generated and inherently correct error correction bits. Therefore this new bit sequence will not comprise any errors, and is not accessible for changing bits in such standard recording devices. The new bit sequence may be recorded on a writable record carrier, but this copy will not comprise the error pattern. It has to be noted, that the logical errors are to be applied to the bit sequence after the error encoding step before writing the physical pattern of marks so as to be uncorrectable by the error decoding step after reading the marks. Applying errors on a higher system level before the error encoding, e.g. by intentionally changing the EDC (error detection codes) in a sector or a sector header in CD-ROM, may be easily mimicked by a malicious party, because the formatting process for higher levels is usually performed via software and therefore accessible for manipulation. An operational, but illegal, copy comprising the higher level errors may be made with standard recording devices and (adapted) software in the connected computer system, e.g. a bit copying program available for making copies of audio CD's.

As burst errors will occur due to dirt or scratches on the surface of a record carrier, error correcting rules, e.g. of CD, are especially designed for correcting burst errors by applying interleaving before storing and de-interleaving after reading. The bit errors constituting such a burst error will be mixed with a far larger number of other bits from the bit sequence by de-interleaving rules which are part of the formatting and error correcting rules. A number of consecutive bit errors sufficient to cause the uncorrectable errors has to be longer than the longest correctable burst error. The error correcting rules are described with FIG. 3. In a preferred embodiment only selected bits of the bit sequence show errors, which bits are selected so as to accumulate by de-interleaving, which de-interleaving is part of the formatting and error correcting rules. This results in a location on the record carrier showing a high concentration of errors, while adjoining locations show only a few or no bit errors. An example of bit errors is described with FIG. 4. Usually error correcting rules and especially (de)interleaving rules will operate on symbols, e.g. on bytes of 8 bits, while the error correcting process is applied to error words of a number of symbols accumulated by de-interleaving. The error symbols are selected to accumulate during de-interleaving to an uncorrectable number in one or a few error words.

An effective way of applying bit errors is to invert each bit from a selected symbol in the original bit sequence without errors, which selected symbol is to be provided with a bit error. Alternatively the bit errors may be applied to the symbols, when said symbols are translated into the pattern of physical marks, e.g. using a controllable EFM encoder. For said symbols the EFM encoder might be controlled to change some of the physical marks to be different from the originally intended marks based on the bit sequence without errors. Preferably the resulting physical marks comply with the constraints specified for the physical marks, as this assures reliable functioning of the reading and decoding process.

FIG. 2 shows a logical map of the recording area of a copy protected record carrier. The recording area is subdivided in addressable sectors from the top at address 00 up to address MAX. The first area 21 may be a lead-in or pre-gap area, such as the 2 second area of silence on CD. The second area is a system area 22, comprising system information about the contents of the disc, such as the PVD (Primary Volume Descriptor) on CD-ROM. The remaining part of the disc is available for user data, such as main information and directory files. The user data area may be subdivided into several areas, which subdivision is free and not limited to the map shown in FIG 2. In this map the remaining area comprises a third area 23 comprising user files 28, a fourth area 24 not comprising user data, and a fifth area 25 again comprising user data. According to the invention the fourth area 24 comprises a padding area 26. The padding area 26 has error sectors 11 indicated by the x and non-error sectors 12, which error sectors comprise the logical errors and constitute the error pattern. The padding area 26 may comprise a large number of sectors, e.g. 20 Mbyte, and may cover substantially all of the recording area not covered by the main information. This has the advantage, that when the presence of the error pattern has to be verified, each time a small number or only one of the error sectors may be selected from the large number available in the padding area. A malicious person trying to intercept the verification will not see a recurring test of one or a few specific sector(s), but mostly different sectors will be read from a large address range for detecting the presence of logical errors. This will effectively prevent the malicious party from designing simple intercepting means for faking the output of reading a sector. A further advantage may be achieved if the writable disc holding the illegal copy has a smaller data capacity than the pressed disc. For example on most CD_ROM's a lot of the capacity is unused, but may be completely filled up by the padding area without increasing the manufacturing cost, while CD-Recordable or CD-ReWritable have a smaller capacity than a maximally filled CD-ROM. In that case not all information (user information and padding area) can be transferred to the illegal copy. In an embodiment, further access control information is comprised in the system area 22 or in some other area not directly accessible in a standard reading device, such as the lead-in, lead-out or pre-gap area 21. The further access control information might be a licence code indicative for the party making use of the system for copy protecting record carriers, and/or may be indicative for the error pattern, e.g. to be used as a seed in a error pattern generating algorithm.

FIG. 3 shows an error correcting unit used in the CD system, called the CIRC (Cross Interleaved Reed-Solomon Code). A detailed description of the CIRC error correcting rules may be found in GB 2076569 (PHQ 80009), document D2, the decoder therein being described with FIG. 7. In FIG. 3 the input (on the left) is a frame of 32 bytes consecutively stored on the record carrier, indicated by the column bytes numbered 0 to 31, comprising twelve data bytes 0–11, four C2 error correcting bytes 12–15, again twelve information bytes 16–27 and four C1 error correcting bytes. The odd bytes are delayed by one cycle in a first delay unit 31, and the resulting error words of 32 bytes are error corrected by the C1 unit 32. The C1 unit can correct one byte error and detect all 2 and 3 byte errors, while 4–32 byte errors are detected with a very low failure rate. If the C1 unit detects un uncorrectable error, it will flag all bytes to be unreliable. The output of the C1 unit is delayed by a second delay unit 33, delaying byte 0 by 27*4=108 frames, byte 1 by 26*4= 102 frames etc. The output of the second delay unit 33 constitutes a second error word, which is error corrected by the C2 unit. The C2 unit usually corrects up to 2 errors, but may correct up to 4 bytes by erasure if the C1 unit flags all detected errors. The output of the C2 unit is descrambled by descramble unit 35. The described functions are the complement of inverse functions in the encoder, all functions being well-known from the CD system and described in detail in document D2. According to the invention a logical error result from bit errors being uncorrectable, therefore bit errors must be present in the input frames accumulating to at least 2 but preferably 3 or more errors in the error words on the input of the C1 unit. Also at least 3 but preferably at least 5 errors should be present in at least one second error word on the input of the C2 unit. For 5 errors in one second error word this requires at least 17 consecutive error-flagged output frames of C1, having errors in a group of 5 consecutively numbered information bytes. For example, errors in byte 0 in frame 0 will accumulate at the input of C2 with errors in byte 2 in frame 8 and errors in byte 4 in frame 16. For creating a cluster of logical errors within a specified data unit, such as a sector in the CD system, preferably more bit errors than the above minimum of 5 errors in 17 consecutive frames should be applied. A further error correcting layer, such as used in CD-ROM for error correcting within a sector, may correct some logical errors uncorrectable by the above error correcting rules. Therefore a larger number of logical errors should be included. An embodiment achieving a safe margin without risk of spreading the errors over a large area has errors in all of the first or second twelve consecutively numbered information bytes. Said errors will spread due to the second delay unit over 12*4=48 frames and 1 additional frame because of the first delay unit, and having 24 consecutive frames with errors, over 48+1+24=73 frames. As a frame comprises 24 information bytes this affects 73*24 bytes=1752 bytes, which is well within one sector of the CD-ROM format (2352 bytes) provided the error frames are positioned within said sector. The sector comprises 98 frames, so at maximum 49 consecutive frames can have errors without affecting neighbouring sectors. It is to be noted, that applying errors to all bytes in the frames, which would be the case if a whole area of the disk would be provided with errors, e.g. by physically damaging the area, is not a solution for creating logical errors. Such errors will spread at least over 28*4+1=113 frames, and with a minimum of 17 consecutive error frames over 130 frames. The number of bytes affected is 130*24=3232, which is far more than one sector.

When errors are detected which are uncorrectable in the C1 and/or C2 unit, the bytes will not be changed, but flagged as errors. Bit errors in information bits results in bit errors to propagate to the output of the error correcting unit, whereas error correction bits are used in the error correction unit and will not be visible at the output. Therefore in a preferred embodiment the bit errors are present in the information bits and not in the error correcting bits.

Moreover, bit errors should not be spread by de-interleaving to adjoining sectors which are to remain error free. Therefore in a preferred embodiment the part of the bit sequence corresponding to non-error sectors adjoining error sectors comprises substantially no bit errors. Although some bit errors may be corrected in the adjoining sectors, a higher risk for uncorrectable errors exists if further errors, e.g. caused by dirt, are combined with said bit errors. In that case a non-error sector may be falsely classified as an error sector.

Although the bit errors are accumulated in a few selected error words and therefore directly affect only the selected locations, a large number of symbols (=bytes) will be flagged by the C1 unit as unreliable (in fact all symbols in all C1 words having 2 or more error bytes). The C2 error unit will first calculate a syndrome to detect any possible errors, which syndrome indicates if errors are present. Further calculation will indicate the number of errors and possibly indicate which symbols need to be corrected. For the correction several approaches may be used, e.g. errors in only 1 or 2 symbols may be corrected directly, and for correcting 2 to 4 error symbols the flags from the previous C1 unit may be used to indicate which symbol to replace (correction by erasure). Usually the C2 unit will not use any C1 flags if it detects 0 or 1 errors. Therefore the large number of flagged, but unchanged, symbols will not be noticed or classified as errors by the C2 unit. Preferably for a sectored format said C1 flagged symbols should be as much as possible within the selected error sector, as additional errors caused by dirt etc. may cause uncorrectable C2 errors in combination with the C1 flagged symbols. For a detailed description of the error processing rules reference is made to D2. In a different embodiment using double layer C2/C1 error encoding errors are introduced during encoding after the C2 encoding step but before the C1 encoding step. Hence during decoding no errors at the C1 decoder are detected, and no flagging of C1 symbols occurs. However at the C2 decoding step, the errors appear and are uncorrectable. All errors can be easily controlled to be within one sector, as the interleaving and de-interleaving occurs after the C2 encoding and before the C2 decoding step. Alternatively a combination of C2 and C1 errors may be used.

The invention can be applied in systems using different error correcting rules, such as DVD. A corresponding pattern of bit errors counteracting the de-interleaving can be found according to the above description. In further applications a more sophisticated approach of error correction might be a repeated application of the error correcting rules by first interleaving the output of the first error correcting process like in the encoder and secondly de-interleave and apply the error correcting rules again. As some errors may be corrected in the first process such a second error correcting process might further correct errors. To prevent such an approach from correcting the logical errors, preferably the bit frequency and positioning of bit errors is such that they are uncorrectable in every error correcting layer.

FIG. 4 shows a bit error pattern for the CIRC error correcting rules as described with FIG. 3. The bit errors are designed to accumulate in the C1 error words as well as in the C2 error words, in both cases to 5 errors. The pattern of errors may be shifted to other information bytes (0–11, 16–27), but should cover only information bytes and no error correction bytes. In FIG. 4 errors in bytes are indicated by the letters a,b,c,d,e, whereas bytes without errors are not marked. To affect 20 consecutive C1 words, 21 frames have been provided with errors, the odd bytes starting one frame earlier and the even frames stopping one frame later to compensate for the first delay unit 31. Due to the delays in the second delay unit 33 the errors marked by the same letter will accumulate in the C2 words, so 4 consecutive C2 frames will have 5 'e' errors, the next 4 C2 frames 5 'd' errors, up to the last 4 C2 frames with 'a' errors. No errors will be compensated because in each C1 or C2 error word either 0 or 5 errors will accumulate. This error scheme may easily be extended for more errors in more consecutive error words as required or for other interleaving rules. Also it may be applied a few times within one sector, to prevent any subsequent burst error correcting process to correct the logical errors. As mentioned above with FIG. 3, the C1 corrector has a 100% detection probability of 2 and 3 error words, while 4–32 errors might occasionally be falsely corrected. Therefore a preferred embodiment using C1 errors only has 3 errors accumulating in the C1 words. An effective error pattern having said 3 C1 errors may be derived from FIG. 4 by only applying the a,b,c errors and omitting the d and e errors. Alternatively instead of having 4 consecutive C1 frames with errors, only the first of each quadruple may be provided with errors, resulting in one C2 frame error. The error pattern starting in byte 0 as indicated in FIG. 4 results in almost all C1 flagged, but unchanged bytes to precede the error bytes, the first one being byte 27 of frame 2 preceding the logical errors by 108 frames. Only a few flagged, but unchanged bytes will follow after the logical errors, i.e. the last one being byte 0 of frame 21 lagging 16 frames. Preferably by synchronizing the affected frames with the sectors the flagged, but unchanged bytes should be positioned within the error sector, e.g. the error pattern of FIG. 4 should be applied at the end of the error sector. Correspondingly, when applying the errors to the highest numbered bytes (e.g. 23–27), most flagged, but unchanged bytes will lag behind the logical errors.

FIG. 5 shows an arrangement for retrieving information from a copy protected record carrier 1 and processing the information. The arrangement comprises a reading unit for reading the bit sequence from the record carrier 1. The read unit comprises a read head 41 for scanning the track and generating a read signal corresponding to the physical marks on the record carrier, and a translating unit 42 for translating the read signal into the bit sequence, e.g. an EFM decoder for decoding in a CD system. The bit sequence is coupled to an error correcting unit 43 for recovering the information and correcting possible errors, e.g. the CIRC corrector in a CD system. The recovered information is coupled to access control means 47 for controlling the access to the information. The access control information is available for further processing on the output 48 of the access control means 47. During reading the read head 41 is positioned on the track by a servo unit 44 of the usual type, while the record carrier is rotated by a motor unit 45. The reading of information is controlled via a controller 46, which controller controls the motor unit 45, the servo unit 44 and the error correction unit 43, and is arranged for receiving read commands, e.g. via an interface to the access control means 47. The access control means 47 may be implemented in circuits built into a reading device also comprising the above reading means. This has the advantage, that the information will not be delivered on the output 48 if the respective access control information is not present on the record carrier. The access control means may alternatively be implemented in a computer connected via an interface to a standard reading device, such as a CD-ROM drive. In the computer the access control means may be built into an interface board or may be effected by software running on a central processing unit. The software for effecting the access control can be delivered to a user on the copy protected record carrier. This is advantageous, in that no dedicated hardware is necessary and in that the user has all means necessary for accessing the copy protected information embodied on the record carrier.

The access control according to the invention will be effected as follows. The access control means will first acquire access control information indicative for the error pattern. This access control information may be a pattern stored on the record carrier, e.g. the licence code described with FIG. 2, or an access code supplied via a network, e.g. internet or on paper. In an embodiment the error pattern may be generated using a seed value and a predefined algorithm, the seed value being stored on the copy protected record carrier. Secondly the presence of logical errors must be verified to assure that the disc is an original, copy protected disc and not an illegal copy. The access control means will select one or more error location(s) on the record carrier, or error sector(s) if the record carrier is formatted in addressable sectors, which error locations should have a logical error according to the error pattern. Thirdly the presence of an error is verified by reading the selected error location. As the reading device will generate an error message on the interface in the event that a sector to be read comprises uncorrectable errors, the presence of the logical errors can be detected effectively. As a copy will not comprise the logical errors, the copy will be rejected and the access to the information will be barred. Preferably a few error locations are selected at random from a large number of error locations available on the record carrier, e.g. in a padding area dedicated to comprise the error pattern having error sectors and non-error sectors. Alternatively the error sectors may be intermixed with valid sectors comprising normal user information. For achieving a fast response for the access control to take place, preferably only one error sector is selected and read. In practice reading one sector having uncorrectable errors might only cause a delay of a few seconds, which delay is caused by the reading device trying to read the sector a few times. Such retries are standard practice to improve the chance for successful recovery of information in the event of dirt or scratches. The error pattern may further be verified by selecting at least one non-error location, but not all non-error locations, which non-error locations should not have a logical error according to the error pattern, and verifying the absence of an error by reading the selected non-error location. As reading a non-error sector will be very fast, e.g. 0.2 seconds, a larger number of non-error sectors, e.g. 10 to 40, is preferably selected and read. Said non-error sectors are preferably selected via a random selection process from all available non-error sectors. In an embodiment the contents of the non-error sectors may be verified, e.g. by including a check value in such a sector to be derived from the sector number and the licence code by a predetermined encryption algorithm. In a further embodiment non-error sectors are selected and verified before and after the one selected error sector. This has the advantage that e.g. 21 to 81 apparently random selected sectors are read, from which only one is to comprise an error. This has the advantage, that a malicious party will have great difficulties trying to mimic this verification process. As the error pattern according to the invention is designed to accumulate all bit errors in the error sectors without affecting the adjoining sectors, preferably some non error sectors adjoining error sectors should be selected. This will most probably expose illegal copies damaged in certain areas to mimic the error pattern. The access control for a computer program may be effected as follows. The information carrier contains the computer program, while some essential data are included in the access control information. The computer program may be encrypted itself, while a short startup program takes the place of the program and controls the access to the main program. The access control information may be, for example, a decoding key, a serial number or access code or, possibly, a small part of the program code (a subroutine, object or module). Needing these essential data, the program can only function well if both the information and the access control information are available. The startup program may read access control information from a hidden place on the record carrier, such as the licence code included in the system area 22 (see FIG. 2) and/or further access data files. Thereafter the presence of the error pattern may be verified as described above.

FIG. 6 shows a schematic diagram for copy protecting a record carrier. In the text below it is assumed, that the invention is applied under control of a licensor. In the first step 61 the publisher creates a new software title 71. The publisher does not need to make any changes to the software in order to use the invention. The system can first be fully developed and tested. In a second step 62 the publisher encrypts the main executable file (e.g. for a DOS or Windows system) for creating an encrypted file set 72. Using a utility provided by the licensor the publisher encrypts it using a licence number as the encryption key. Unique licence numbers are provided by the licensor for every product produced. As an example, if the software title to be protected has a program called foo.exe the encryption process encrypts it, renames it to foo.icd and includes a new program, provided by the licensor which is renamed to foo.exe. This program is then responsible for carrying out the security checks, verifying the licence number and launching the encrypted program (foo.icd). In a third step 63 the publisher creates an image file 73, such as an ISO 9660 Image, from the encrypted file set 72. Using a CD Authoring package the publisher creates an image file 73 of his complete software title onto a hard disk drive. In a fourth step 64 the image file 73 is modified to create the full contents 74 of the copy protected record carrier, having a logical map as described with FIG. 2. A second utility provided by the licensor modifies the image file 73 by adding a licence structure including the licence number to the system area 22. The image file 73 is further be modified to pad the size of the image to include the padding area. The total length is preferably more than 74 minutes (333,000 sectors). The licence structure holds a reference to the start and end sectors of the padding area. In the padding area, sectors will either be good or bad and the distribution of the sectors will be determined by a pseudo-random process, which may be seeded from the licence number. In a fifth step 65 the image file is processed to create a master disc 75, e.g. by a Mastering House. The image file 74 is sent to the Mastering House on magnetic tape or other suitable media. Using Laser Beam Recorder software modified according to the invention a master disc 75 is produced. The Laser Beam Recorder software makes use of the licence structure to determine which sectors in the padded area are marked as being bad and which ones are good. The ratio of marked to good sectors may be fixed, e.g. approximately 50%. The errors are applied according to the error patterns described above with FIG. 4. In a sixth step 66 copy protected record carriers 76, such as CD-ROM's, are produced by duplicating the master disc 75. The error pattern is transferred to each disc in this step.

Although the invention has been explained by an embodiment using the CD-ROM as example having the CIRC error correcting rules, it will be clear that other record carriers, magnetic or optical tape, etc can be employed in the invention, if such record carriers comprise information protected by predefined error protecting rules. For example, the high density DVD disc also uses an error correcting process. Whilst the invention has been described with reference to preferred embodiments thereof, it is to be understood that these are not limitative examples. Thus, various modifications may become apparent to those skilled in the art, without departing from the scope of the invention, as defined by the claims. For example, applying error patterns in error protected data transmitted via a network such as internet may provide access control according to the invention. Further, the invention lies in each and every novel feature or combination of features.

List of related documents
(D1) EP-0545472 (PHN 13922) Closed information system with physical copy protection
(D2) GB 2076569 (PHQ 80009) The CIRC error detection and correction.
(D3) WO 95/03655 CD PROM encryption system.

What is claimed is:

1. A method for controlling access to a record carrier, comprising the steps of:
   creating an image file containing main information;
   generating access control information for controlling the access to the main information;
   producing a record carrier depending on the image file and the access control information, including the steps of:
   creating a correctable bit sequence by applying formatting and error correcting rules to the image file;
   modifying the correctable bit sequence according to the access control information with sufficient bit errors to provide uncorrectable errors which cannot be corrected by the error correcting rules and which constitute a predefined uncorrectable error pattern defined by uncorrectable error locations and error correctable locations; and
   translating the modified bit sequence into a physical pattern of marks on the record carrier.

2. The method of claim 1, in which at least part of the main information is encrypted depending on the access control information.

3. The method of claim 1, in which at least some of the access control information is included in the image file and the predefined uncorrectable error pattern is generated depending on the included access control information.

4. The method of claim 1, further comprising the step of multiplicating the record carrier.

5. A copy protected record carrier comprising:
   a substrate; and
   a correctable bit sequence stored thereon representing information according to predefined formatting and error correcting rules, the information including main information and access control information for controlling the access to the main information, and in which the bit sequence includes means including sufficient bit errors for providing uncorrectable errors which cannot be corrected by the error correcting rules and which constitute a predefined uncorrectable error pattern representing at least part of the access control information, the uncorrectable error pattern defined by uncorrectable error locations and error correctable locations.

6. The carrier of claim 5, in which: the record carrier is subdivided into addressable sectors, the record carrier includes a padding area which includes uncorrectable error sectors and error correctable sectors, the uncorrectable error sectors contain the uncorrectable errors and the error correctable sectors contain no uncorrectable errors, and the pattern of uncorrectable error sectors and error correctable sectors together constitute the uncorrectable error pattern.

7. The carrier of claim 6, in which part of the bit sequence corresponding to an error correctable sector which adjoin an uncorrectable error sector, contains no bit errors.

8. The carrier of claim 6, in which, the record carrier has a predetermined information storage capacity of which the main information covers a part, and the padding area essentially covers the remaining part of the information storage capacity.

9. The carrier of claim 5, in which, the modified bit sequence includes information bits and error correction bits, and the information bits contain the bit errors that result in uncorrectable errors and the error correction bits have no bit errors that result in uncorrectable errors.

10. The carrier of claim 5, in which the bit errors that provide the uncorrectable errors are located so as to accumulate in at least one error word more than in another error word and the one error word cannot be corrected by an error word correcting rule during reproduction.

11. The carrier of claim 10, in which the record carrier is a CD, and the error word correcting rule is contained in the C2 layer.

12. The carrier of claim 10, in which the bit errors that provide the uncorrectable errors are located so as to accumulate by de-interleaving, which de-interleaving is part of the formatting and error correcting rules.

13. The carrier of claim 10, in which the bit errors that provide the uncorrectable errors are located so as to accumulate in at least one second error word more than in another second error word and the one second error word cannot be corrected by a second error word correcting rule during reproduction.

14. The copy protected record carrier of claim 13, in which the record carrier is a CD, the error word correcting rule being the C2 layer and the second error word correcting rule being the C1 layer of the CD error correcting rules.

15. A method for detecting access control information on the copy protected record carrier of claim 5, comprising the steps of:
    storing a bit sequence representing information according to predefined formatting and error correcting rules on a record carrier, the information including main information and access control information for controlling the access to the main information, and in which the bit sequence includes sufficient bit errors to provide uncorrectable errors which cannot be corrected by the error correcting rules and which constitute a predefined uncorrectable error pattern representing at least part of the access control information, the uncorrectable error pattern defined by uncorrectable error locations and error correctable locations;
    selecting at least one uncorrectable error location, but not all uncorrectable error locations, which uncorrectable error location(s) should have an uncorrectable error according to the predefined uncorrectable error pattern; and
    verifying the presence of the uncorrectable error by reading the selected uncorrectable error location and detecting the uncorrectable error during error correction.

16. The method of claim 15, in which the method further comprises the steps of:
    selecting at least one error correctable location, but not all error correctable locations, which error correctable location should not have an uncorrectable error according to the predefined uncorrectable error pattern; and
    verifying the absence of an uncorrectable error by reading the selected error correctable location and attempting to detect an uncorrectable error.

17. The method of claim 15, in which at least one error correctable location is selected which adjoins an uncorrectable error location.

18. The method of claim 15, further comprising the a step of retrieving at least some access control information indicating the uncorrectable error pattern from the main information before selecting locations.

19. The method of claim 15, in which, the record carrier is subdivided into addressable sectors, and the presence or absence of an uncorrectable error at a location is verified by reading the respective sector and detecting the uncorrectable error during error correction.

20. The carrier of claim 5, in which the record carrier includes software for executing the method of selecting at least one uncorrectable error location, but not all uncorrectable error locations, which uncorrectable error location should have an uncorrectable error according to the predefined uncorrectable error pattern, and verifying the presence of the uncorrectable error by reading the selected uncorrectable error location and detecting the uncorrectable error during error correction.

21. A retrieval arrangement for retrieving information from the copy protected record carrier of claim 5, the arrangement comprising:
    reading means for reading a copy protected record carrier, including a read unit for extracting a bit sequence stored on the record carrier and an error correcting unit for processing the bit sequence to retrieve the information that was copy protected; and
    access control means for controlling the access to the information according to access control information detected by selecting at least one uncorrectable error location, but not all uncorrectable error locations, which at least one uncorrectable error location should have an uncorrectable error according to the uncorrectable error pattern, and by verifying the presence of an uncorrectable error by reading the selected uncorrectable error location via the reading means and detecting an uncorrectable error during error correction.

22. The retrieval arrangement of claim 21, in which, the record carrier is subdivided into addressable sectors, and the reading means includes a control unit for controlling the reading of a sector and generating an error message when an uncorrectable error is detected.

23. A recorder for producing the copy protected record carrier of claim 5, comprising:
    means for providing an image file containing main information;
    means for generating access control information for controlling access to the main information;
    means for producing a record carrier depending on the image file and the access control information, including the steps of:
        creating a correctable bit sequence by applying the formatting and error correcting rules to the image file;
        modifying the correctable bit sequence according to the access control information to constitute uncorrectable errors which cannot be corrected by the error correcting rules and which constitute a predefined uncorrectable error pattern defined by uncorrectable error locations and error correctable locations; and
        translating the modified bit sequence into a physical pattern of marks on the record carrier.

24. A player for detecting access control information on a record carrier of claim 5 to access other information on the record carrier, comprising:
    means for selecting at least one uncorrectable error location, but not all uncorrectable error locations on a record carrier, which uncorrectable error location should have an uncorrectable error according to a predefined uncorrectable error pattern; and means for verifying the presence of an uncorrectable error by reading the selected uncorrectable error location and detecting an error that can not be corrected during error correction.

25. A system for programming to produce a recorder for producing the copy protected record carrier of claim 5, comprising:

means for providing programmed apparatus for generating access control information for controlling the access to an image file of main information;

means for providing programmed apparatus for producing a record carrier depending on the image file and the access control information, including:

means for providing programmed apparatus for creating a bit sequence by applying formatting and error correcting rules to the image file;

means for providing programmed apparatus for modifying the bit sequence according to the access control information to constitute uncorrectable errors which cannot be corrected by the error correcting rules and which constitute a predefined uncorrectable error pattern defined by uncorrectable error locations and error correctable locations;

means for providing programmed apparatus for translating the modified bit sequence into a physical pattern of marks on the record carrier.

26. A system for programming to produce a player for playing the record carrier of claim 5, comprising:

means for providing programmed apparatus for selecting at least one uncorrectable error location, but not all uncorrectable error locations, which uncorrectable error location should have an uncorrectable error according to a predefined uncorrectable error pattern; and means for providing programmed apparatus for verifying the presence of the uncorrectable error by reading the selected uncorrectable error location.

* * * * *